T. J. CORNELL.
Gang-Plow.
No. 58,384.
Patented Oct. 2, 1866
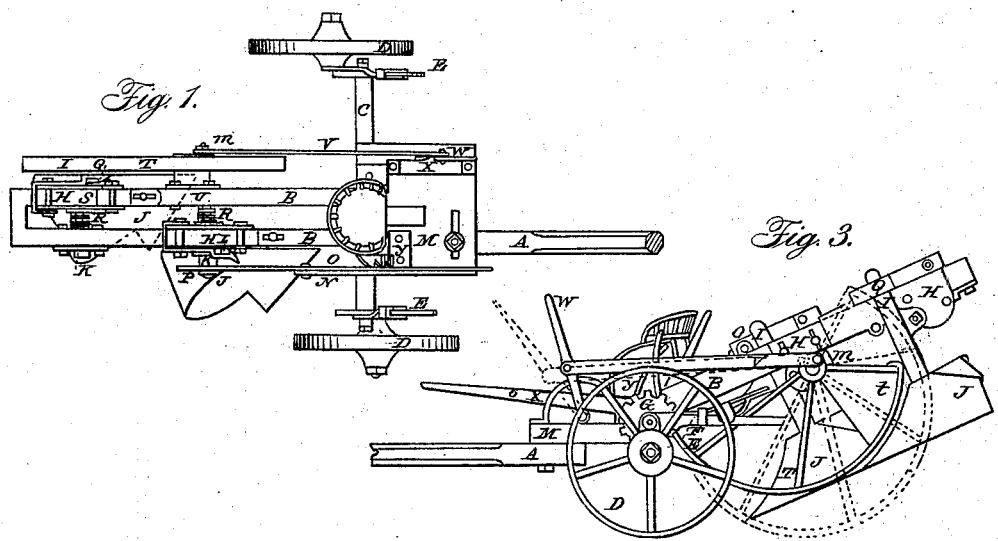
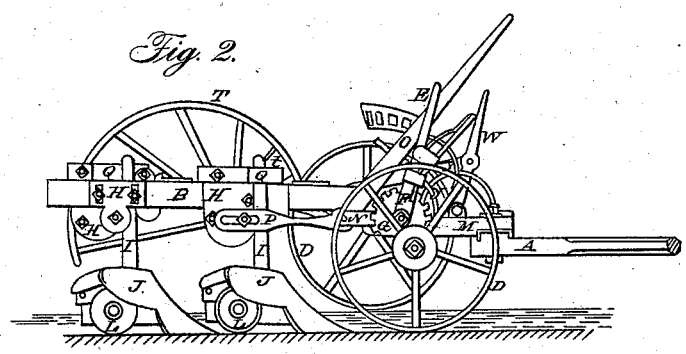
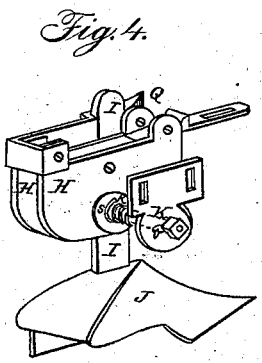
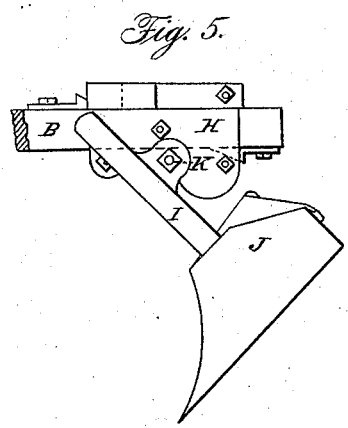
Witnesses:
R. C. Weightman
Thomas J. Hurdle
Inventor:
Thos J Cornell
By Munn & Co.
Attorneys

UNITED STATES PATENT OFFICE.

THOMAS J. CORNELL, OF DECATUR, ILLINOIS.

IMPROVEMENT IN GANG-PLOWS.

Specification forming part of Letters Patent No. 58,384, dated October 2, 1866.

*To all whom it may concern:*

Be it known that I, THOMAS J. CORNELL, of Decatur, in the county of Macon and State of Illinois, have invented a new and Improved Gang-Plow; and I do hereby declare the following to be a full, clear, and exact description of the same, sufficient to enable one skilled in the art to which the invention appertains to make use of it, reference being had to the accompanying drawings, which form a part of this specification, and in which—

Figure 1 is a top or plan view. Fig. 2 is a side elevation viewed from the furrow side, with the plow adjusted for work. Fig. 3 is a side elevation from the land side, the plows elevated from the soil for turning or moving. Fig. 4 is a detached view of a plow, showing the attachment of its standard with the engaging-catch and return-spring. Fig. 5 is a detached view of the plow, showing its position passing over obstructions.

My invention is intended to secure two points—first, such an attachment of the plows to the beams that when they are brought in contact with a stone or root, or any other obstruction through which they cannot pass, and a heavy stress of the team is bearing upon them, sooner than break the plow they will oscillate backward and pass over the obstruction.

The improved adjustment is secured by journaling the standard on a horizontal axis, a catch which holds the standard in a vertical position until a certain strain is reached, and a spring which restores the plow to its nor-normal position when the obstruction is passed.

The second point of improvement consists of a device to make the draft of the team raise the plow from the ground when so desired. It consists of an eccentric segment; the end nearest to whose axis coming first in contact with the ground, the rolling of the segment as the plow advances raises the latter out from the soil to the position shown in Fig. 3, the segment being in red lines in its lifting position, and in black lines in position for transportation, the plow being retained in its raised position by other means.

In the drawings, A represents the tongue, and B B the beams, whose forward ends are supported by the axle C and wheels D D. As one of the wheels is intended to run in the furrow and the other on the land, their axes are made adjustable as to height by means of levers E, to whose ends the wheels are journaled, the required position of the lever being secured by the engagement of a catch, F, in the segment-rack G, attached to the end of the axle C.

When traveling on the road, or to and from the field, the wheels may be easily adjusted so as to render the position of the driver more comfortable. This adjustability forms no part of the novelty of my invention.

To the beams B the boxes H are attached, and in each of these boxes the standard I of a plow, J, is journaled upon a horizontal axis, K, which passes through the sides of the box and through the beams.

There is no peculiar feature of novelty in the plow itself, so far as this specification is concerned. It has land-side and mold-board, and a wheel, L, to lessen friction.

Attached to the axle C, and platform M, if necessary, is an arm or holder, N, to which is pivoted a lever, O, whose purpose is to enable the operator to regulate the vertical height of the plows, or, rather, to vibrate the beams in a vertical plane on their axial center on the axle C. The lever is connected by a link, P, with the plows, so that its forward and backward motion effect the vertical motion of the plow-beams, as described. In the drawings the link is connected to the axis K, upon which the plow-standard vibrates, the axis K traversing a slot in the link as the beams rise and fall.

The standard I of the plow J is maintained in vertical position by the catch Q, whose notch in contact with the edge of the standard I is slightly inclined, so as to permit the standard to spring the catch to one side upon an extreme pressure being applied to the point of the plow, as in the case of an immovable stone in contact therewith. This position is represented in Fig. 5. Upon passing the obstacle the spring R, which is attached to the collar S on the axis K, and to the box H, restores the plow to its normal working position.

The arrangement to enable the draft of the team to assist in withdrawing the plows from the ground consists of an eccentric segment-wheel, T, which is journaled to a suitable boxing, U, on the side of one of the beams B. To a wrist, *m*, on the hub of the said segment-wheel T is pivoted a connecting-rod, V, which is attached to the lever W.

When it is desired to raise the plows from the ground, the lever W is disconnected from the notch in the rack X and pushed backward, so as to rotate the segment T in the direction of the motion of the plows. The counterpoise-weight $t$ causes that corner of the segment to strike the unplowed surface of the ground, and, as the machine progresses and the segment rotates, the axis of the segment-wheel and the beams of the plows are raised from the soil, the lever O catching in the notches of the rack Y, and maintaining the plows in the position shown in Fig. 3. In this figure the red lines show the position of the segment-wheel T and its lever when its work is accomplished, and the black lines show it as rotated out of contact with the ground by the counterbalance-weight $t$.

By this arrangement the plowman has only to push the lever at his right hand out of its notch to set the plows in the ground, and only to push the lever at his left hand out of its notch to bring the segment-wheel into operation to raise the plows from the ground by the power of the team.

Having thus described my invention, what I claim therein as new, and desire to secure by Letters Patent, is—

1. The plow-standard I, journaled on a horizontal axis, K, to vibrate rearward under the circumstances described.

2. The catch Q, in combination with the standard I, operating as described.

3. The spring R, in combination with the standard I, operating as described.

4. The eccentric segment W, in combination with the beam or beams of the plow, and operating substantially as described.

THOS. J. CORNELL.

Witnesses:
GEO. GOODMAN,
F. S. MURPHY.